United States Patent
Vierhout

(10) Patent No.: US 11,285,571 B1
(45) Date of Patent: Mar. 29, 2022

(54) FUEL NOZZLE SEAL REMOVAL TOOL

(71) Applicant: Delavan Inc., West Des Moines, IA (US)

(72) Inventor: Robert W. Vierhout, Cumming, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 17/157,904

(22) Filed: Jan. 25, 2021

(51) Int. Cl.
| | |
|---|---|
| *B23P 19/04* | (2006.01) |
| *B25B 27/00* | (2006.01) |
| *B23P 19/08* | (2006.01) |
| *F02M 61/14* | (2006.01) |
| *B05B 15/65* | (2018.01) |

(52) U.S. Cl.
CPC ............. *B23P 19/04* (2013.01); *B23P 19/042* (2013.01); *B23P 19/084* (2013.01); *B25B 27/0028* (2013.01); *B05B 15/65* (2018.02); *F02M 61/14* (2013.01); *F02M 2200/16* (2013.01); *F02M 2200/852* (2013.01)

(58) Field of Classification Search
CPC ....... B23P 19/04; B23P 19/042; B23P 19/084; B05B 15/65; B25B 27/0028; F02M 61/14; F02M 2200/16; F02M 2200/852; F23R 3/283
USPC .................. 29/426.4, 402.02; 83/405; 60/740
See application file for complete search history.

(56) References Cited

U.S. PATENT DOCUMENTS

| | | | | |
|---|---|---|---|---|
| 3,014,271 A | * | 12/1961 | Englund | ............. B25B 27/0028 29/263 |
| 3,084,423 A | * | 4/1963 | Fullerton | ............ B25B 27/0028 29/235 |
| 3,286,335 A | * | 11/1966 | Di Pietra | ................ F01D 11/00 29/888.3 |
| 3,564,696 A | * | 2/1971 | Shepanski | ........... B25B 27/0028 29/235 |
| 3,809,046 A | * | 5/1974 | Kammeraad | ............. F01L 3/08 123/188.9 |
| 3,909,916 A | * | 10/1975 | Neff | .................... B25B 27/0028 29/235 |
| 3,940,840 A | | 3/1976 | Bellia | |
| 4,466,240 A | * | 8/1984 | Miller | .................... F23R 3/283 60/740 |

(Continued)

OTHER PUBLICATIONS

YouTube Video: "Replacing outboard oil seals the hack way" posted on "Dangar Marine" Channel. Published to the internet May 14, 2016. URL: https://www.youtube.com/watch?v=c14ixpVXrZ0&t=532s; NPL shows method of removing seal by hand using a hammer and punch to deform and remove oil seal. (Year: 2016).*

Primary Examiner — Sizo B Vilakazi
Assistant Examiner — Brian R Kirby
(74) *Attorney, Agent, or Firm* — Locke Lord LLP; Joshua L. Jones; Gabrielle L. Gelozin

(57) ABSTRACT

A system comprises a holder including a mounting feature configured to mount to a flange of a fuel injector and a block including a mounting feature configured to mount to a side of the flange that is opposite from the holder. The system includes, punch configured to pass through at least one punch aperture in the block. The punch aperture is configured to guide a tip of the punch into position to deform a c-seal seated in a seal channel of the flange. A method for using the system using the system is also disclosed.

15 Claims, 4 Drawing Sheets

(56) References Cited

U.S. PATENT DOCUMENTS

| | | | | |
|---|---|---|---|---|
| 4,483,137 A * | 11/1984 | Faulkner | ............... | F02C 3/30 |
| | | | | 60/39.55 |
| 4,813,120 A * | 3/1989 | Fournier | ............ | B25B 27/0028 |
| | | | | 29/235 |
| 5,692,282 A * | 12/1997 | Baca | ............... | B25B 27/0028 |
| | | | | 29/235 |
| 5,771,696 A * | 6/1998 | Hansel | ............... | F23D 23/00 |
| | | | | 60/739 |
| 6,065,198 A * | 5/2000 | Vitous | ............. | B25B 27/0028 |
| | | | | 29/258 |
| 6,098,261 A * | 8/2000 | Goguen | ............. | B25B 27/06 |
| | | | | 29/275 |
| 6,543,113 B1 * | 4/2003 | Khurana | ........... | B25B 27/0028 |
| | | | | 29/235 |
| 6,779,239 B2 * | 8/2004 | Kefalas | ............. | B23P 6/002 |
| | | | | 134/22.18 |
| 7,703,287 B2 * | 4/2010 | Haggerty | ............ | F23R 3/283 |
| | | | | 60/740 |
| 7,849,575 B2 * | 12/2010 | Hume | ............... | B25B 27/0028 |
| | | | | 29/263 |
| 8,572,987 B2 * | 11/2013 | Carlisle | ............ | F23R 3/283 |
| | | | | 60/796 |
| 2010/0058765 A1 * | 3/2010 | Duval | ............... | F23R 3/283 |
| | | | | 60/740 |
| 2012/0054997 A1 * | 3/2012 | Villa | ............... | F02M 61/168 |
| | | | | 29/426.1 |
| 2017/0000278 A1 | 1/2017 | Hansen et al. | | |

* cited by examiner

Fig. 3
Fig. 4
Fig. 5
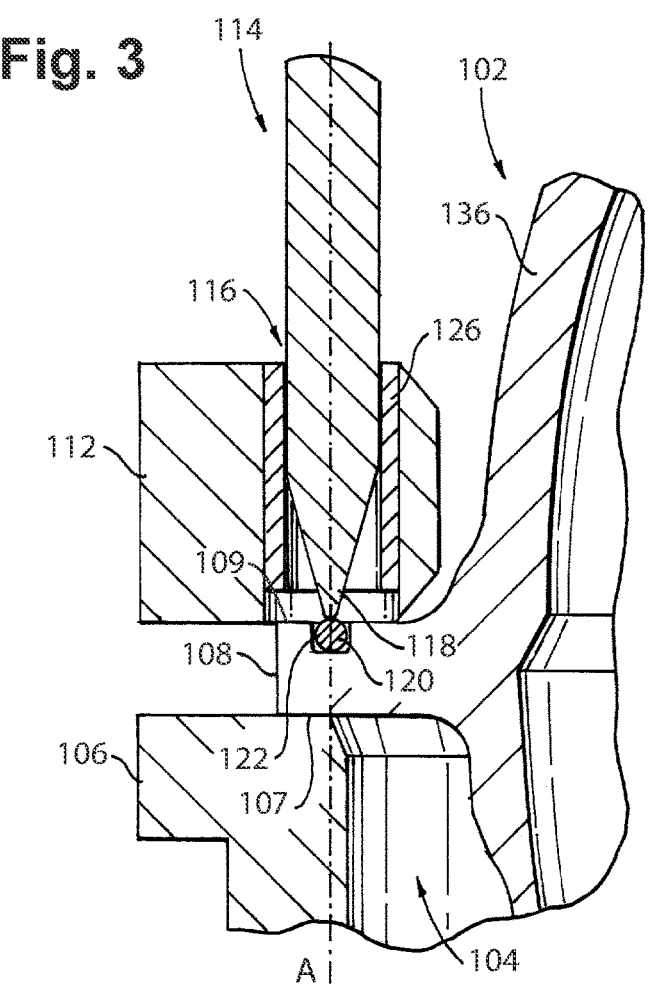
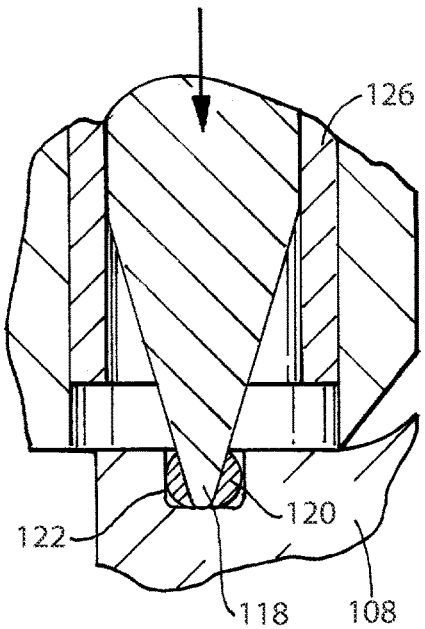
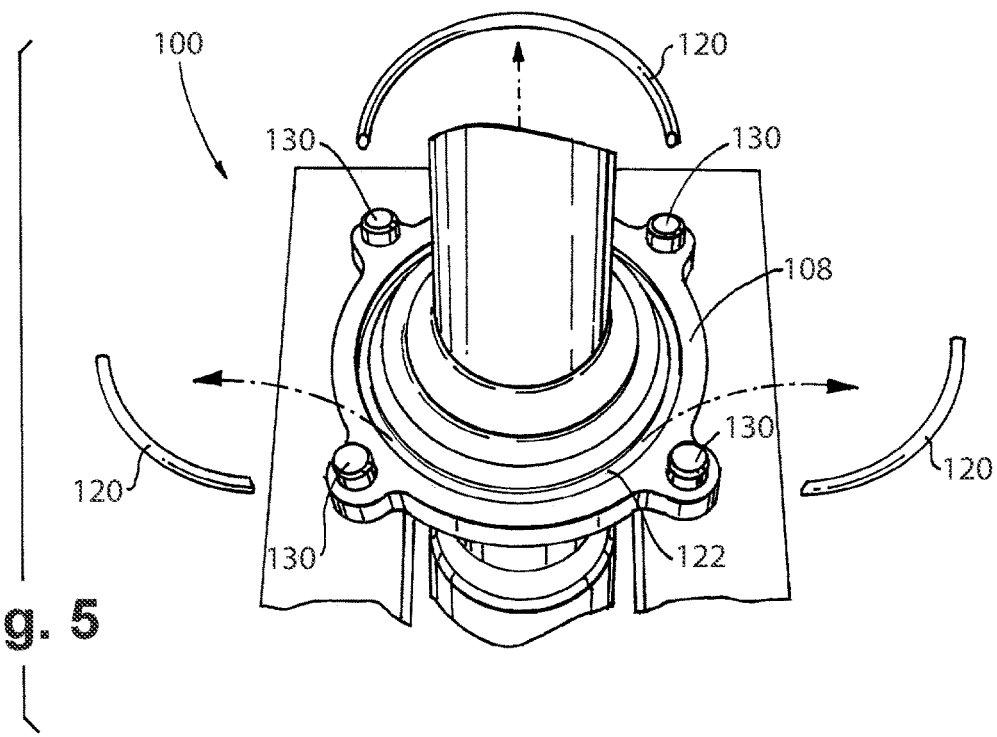

FUEL NOZZLE SEAL REMOVAL TOOL

BACKGROUND

1. Field

The present disclosure relates to fuel nozzles, and more particularly to seals for fuel nozzles and their removal.

2. Description of Related Art

A c-seal is used to seal between fuel injectors in gas turbine engines and the high pressure engine case. When soft materials are used for the c-seal, such as copper, brass, or the like, the c-seal can be removed from the fuel injector during maintenance using traditional techniques with relative ease. The traditional technique involves using a hammer and chisel method to remove the c-seal. However, if a harder material is used for the c-seal, removal of the c-seal from the fuel injector without damaging the fuel injector can be dependent on the skill and steady hands of the individual removing the c-seal. It is not therefore certain that damage to the injector can be avoided.

The conventional techniques have been considered satisfactory for their intended purpose. However, there is an ever present need for improved systems and methods for simplified and damage free removal of fuel nozzle seals. This disclosure provides a solution for this need.

SUMMARY

A system comprises a holder including a mounting feature configured to mount to a flange of a fuel injector and a block including a mounting feature configured to mount to a side of the flange that is opposite from the holder. The system includes, a punch configured to pass through at least one punch aperture in the block. The punch aperture is configured to guide a tip of the punch into position to deform a c-seal seated in a seal channel of the flange. The tip of the punch is shaped to fit within the seal channel and the punch can include an enlarged end opposite the tip configured for driving the punch into the seal channel.

The at least one punch aperture can be a plurality of punch apertures, each punch aperture configured to guide the tip of the punch into position to deform a c-seal seated in a seal channel of the flange. Each punch aperture in the plurality of punch apertures can include a bushing seated therein. The bushing can be configured to facilitate guided movement of the punch through the respective aperture in the block. The block can also include a plurality of pin apertures therethrough for receiving pins to engage with the holder through mounting apertures in the flange of the fuel injector.

The punch apertures can alternate with the pin apertures in a circumferential pattern around the block, and there can be three punch apertures and four pin apertures. The block can define a u-shape about a main channel configured to accommodate a feed arm of the fuel injector. The holder can define a u-shape about a main channel, such that the holder and block are mounted to the flange with the u-shape of the holder opening in an opposite direction from that of the block.

A method includes removing a fuel injector from a system, seating the fuel injector in a holder, affixing a block to the fuel injector and holder, inserting a punch into one of the punch apertures, striking the punch with a force to deform a c-seal engaged with the fuel injector, removing the block from the holder and fuel injector, and removing the c-seal from the fuel injector.

Inserting the punch into one of the punch apertures and striking the punch can be repeated for each of the punch apertures. Affixing the block to the fuel injector and holder can include seating a respective pin aperture of the block onto a respective pin passing from the holder through flange of the fuel injector. Affixing the block can include accommodating a feed arm of the fuel injector in the main channel. Affixing the block can include affixing the block so the holder and block are mounted to the flange with the u-shape of the holder opening in an opposite direction from that of the block.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 3 is a schematic partial cross sectional view of a portion of the system of FIG. 1;

FIG. 4 is a schematic enlarged view of the system of FIG. 3, showing a punch deforming a seal in a seal channel in the system of FIG. 1;

FIG. 5 is a top down view of the system of FIG. 1 showing a deformed seal;

DETAILED DESCRIPTION

Figure 1:
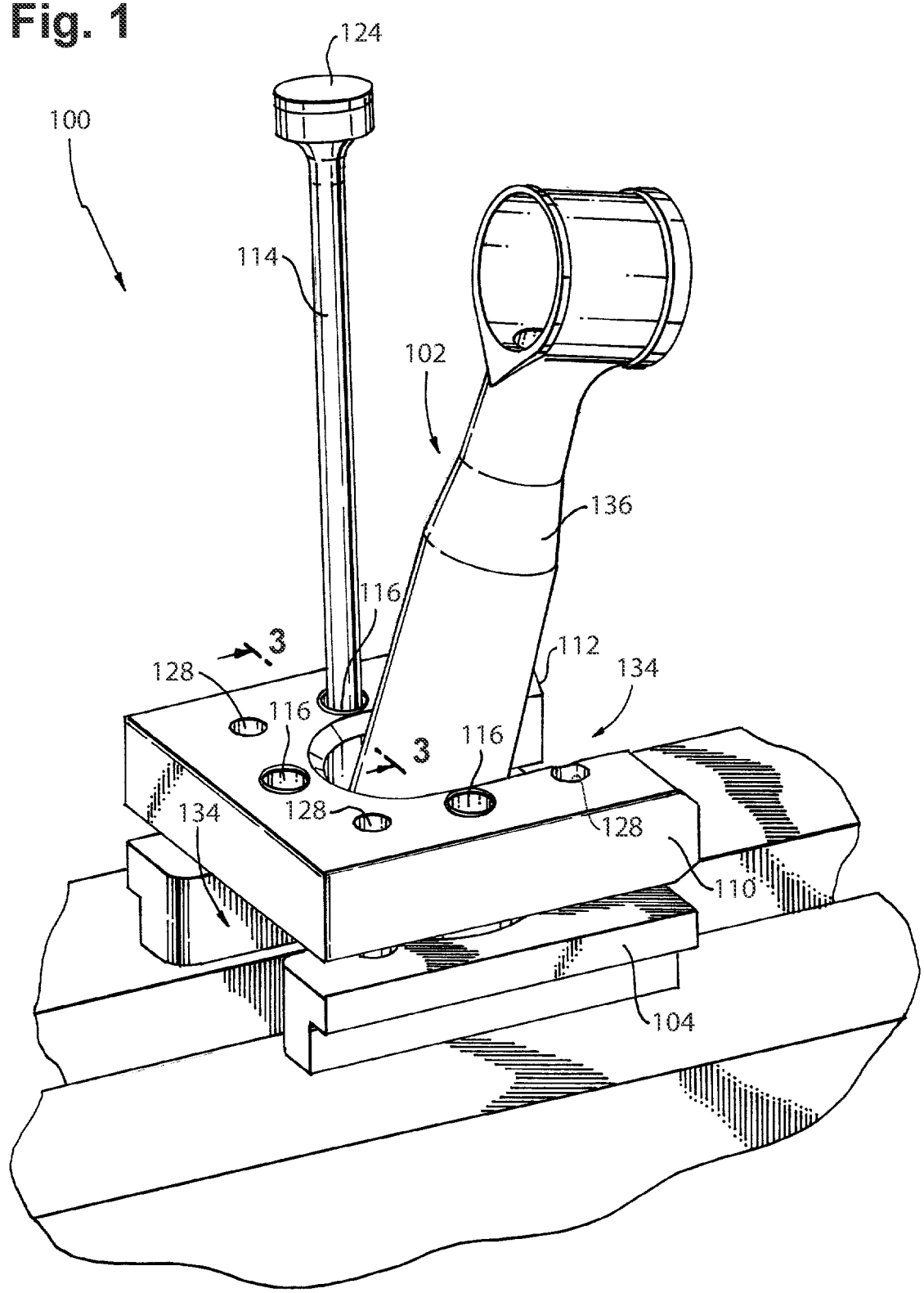
FIG. 1 is a schematic perspective view of an embodiment of a fuel nozzle seal removal system constructed in accordance with the present disclosure, showing a fuel injector mounted in the system.
Figure 2:
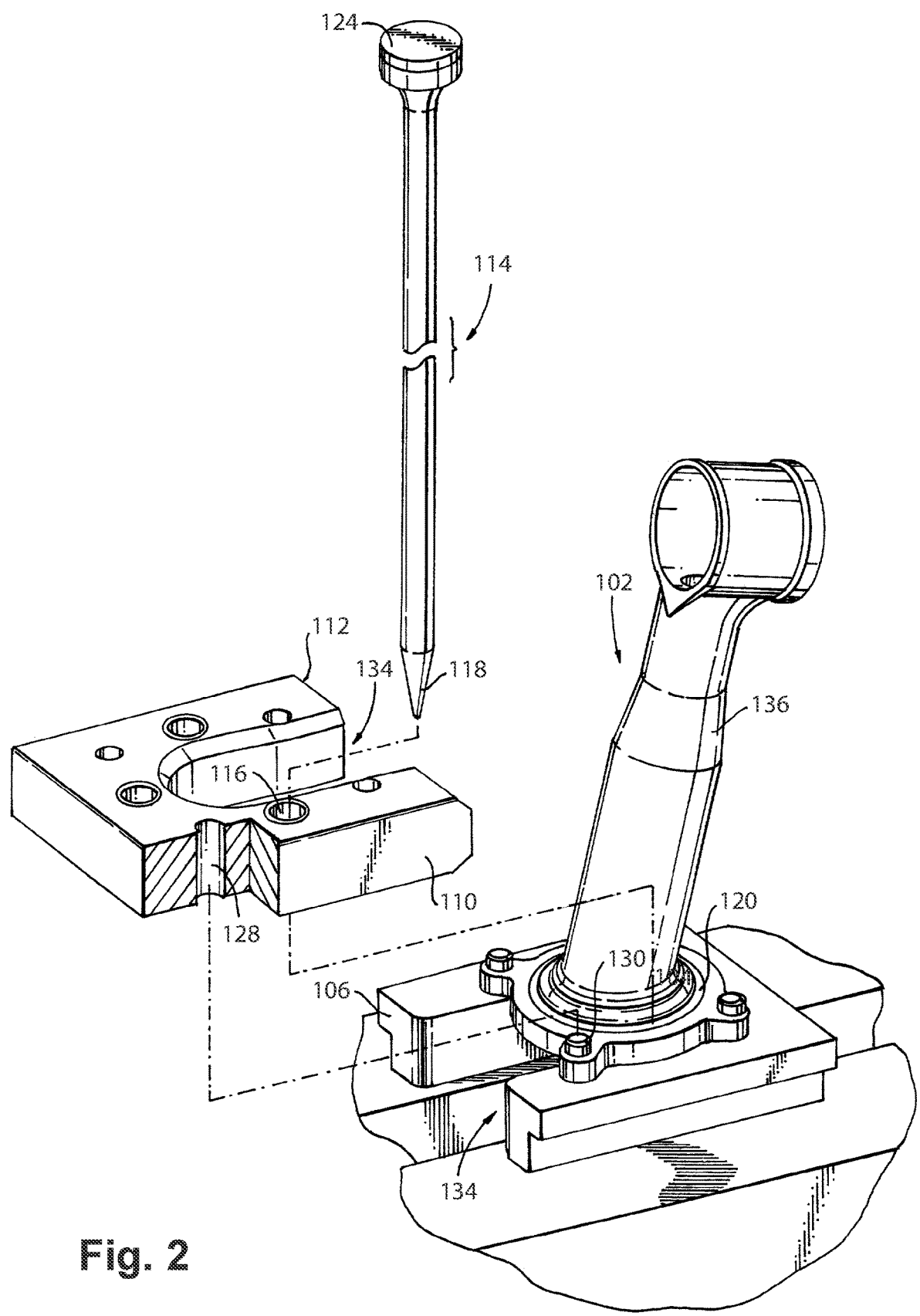
FIG. 2 is an exploded perspective view of the system of FIG. 1.
Figure 6:
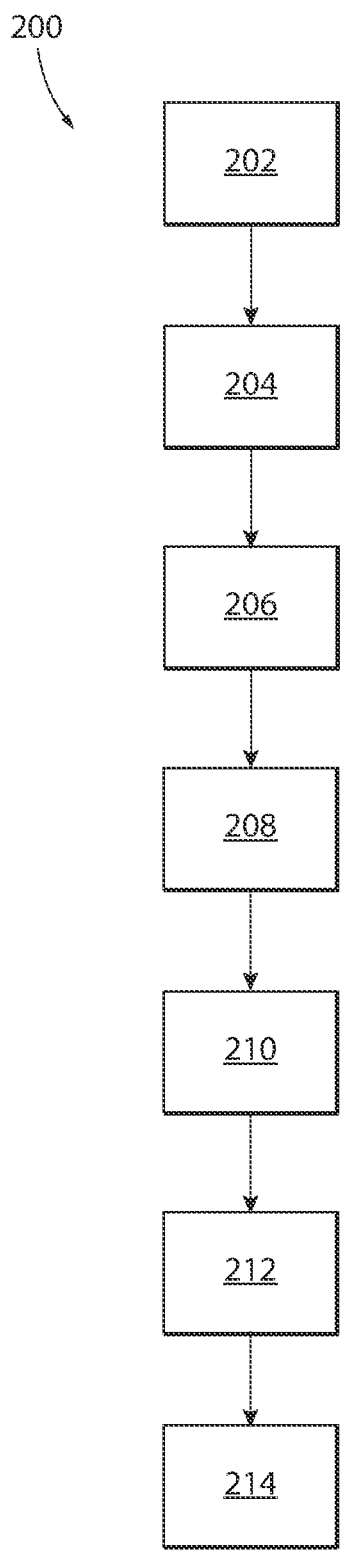
FIG. 6 is a schematic box diagram of a method.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used for removing seals from fuel injectors with reduced variability in the results based on skill of the individual performing maintenance.

A system 100, e.g. a system for removing a seal from a fuel injector 102, can include a holder 104, where the holder 104 includes a mounting feature 106 configured to mount to a first side 107 of a flange 108 of the fuel injector 102. The holder 104 can also include a block 110 including a mounting feature 112 configured to mount to a second side 109 of the flange 108 opposite of the first side 107 of the flange 108 from the holder 104.

A punch 114 can be configured to pass through a punch aperture 116 in the block 110. The punch aperture 116 can be configured to guide a tip 118 of the punch 114 into position to deform a c-seal 120 seated in a seal channel 122. For example, the tip 118 of the punch 114 can be shaped and sized to fit within the punch aperture 116, for example, the tip 118 can be flat relative to a longitudinal axis A of the punch 114. The punch 114 can include an enlarged end 124 opposite the tip 118 configured for driving the punch 114 into the seal channel 122 with any suitable force. Deforming the c-seal 120 can include changing a shape of the seal 122 to break the sealed connection with the seal channel 122, or deforming the seal 120 can include breaking the seal 120 into pieces to allow for removal of seal 120 from the seal channel 122 (e.g. as shown in FIG. 5).

In embodiments, the block 110 can include a plurality of punch apertures 116, and each punch aperture 116 can include a bushing 126 seated therein configured to facilitate guided movement of the punch 114 through the respective aperture 116. For example, if the tip 118 is flat relative to a longitudinal axis A of the punch 114, the bushings can be configured to align the tip 118 with the seal channel 122, however, the bushings 126 can be configured to assist in aligning any shaped tip 118 as the tip 118 passes through the punch aperture 116. The block 110 can also include a plurality of pin apertures 128 for receiving pins 130 to engage with the holder 104 through corresponding mounting apertures in the flange 108 of the fuel injector 102.

The punch apertures 116 can alternate with the pin apertures 128 in a circumferential pattern around the block 110, and in embodiments, the block 110 can include three punch apertures 116 and four pin apertures 128, however any suitable number can be used. The block 110 can define a u-shape about a main channel 134 configured to accommodate a feed arm 136 of the fuel injector 102. The holder 104 can also define a u-shape about a main channel 134, such that the holder 104 and block 110 can be mounted to the flange 108 with the u-shape of the holder 104 opening in an opposite direction from that of the block 110.

A method 200 can include, removing 202 a fuel injector (e.g. from a gas turbine engine), seating 204 the fuel injector in a holder, affixing 206 a block to the fuel injector and holder, inserting 208 a punch into one of the punch apertures, striking 210 the punch with a force to deform a c-seal engaged with the fuel injector, removing 212 the block from the holder and fuel injector, and removing 214 the c-seal from the fuel injector.

Inserting 208 the punch into one of the punch apertures and striking 2010 the punch can be repeated for each of the punch apertures. Affixing 206 the block to the fuel injector and holder can include seating a respective pin aperture of the block onto a respective pin passing from the holder through flange of the fuel injector. Affixing 206 the block can include accommodating a feed arm of the fuel injector in the main channel. Affixing 206 the block can include affixing the block so the holder and block are mounted to the flange with the u-shape of the holder opening in an opposite direction from that of the block.

C-seals for fuel nozzles can be made of different materials depending on the type and/or model of the respective fuel injector. For example, certain c-seals may be made of a harder material and may be designed for a tighter press fit than other nozzle seals. Conventionally, a c-seal is removed using a "hammer and chisel" method. However, harder material and tighter fit can make removal of the seal using this method difficult to do without damaging the nozzle flange. Results of depend on operators' skillset as it is common to slip and damage the flange or seal channel. The methods and systems of the present disclosure, as described above and shown in the drawings thus provide for better control of the deformation of the seal and improved ergonomics of the "hammer and chisel" process so that the seal can be removed without damage to the nozzle. While the apparatus and methods of the subject disclosure have been shown and described, those skilled in the art will readily appreciate that changes and/or modifications may be made thereto without departing from the scope of the subject disclosure.

What is claimed is:

1. A system comprising:
    a holder including a mounting feature configured to mount to a flange of a fuel injector;
    a block including a mounting feature configured to mount to a side of the flange that is opposite from the holder;
    at least one punch aperture defined in the block; and
    a punch configured to pass through the at least one punch aperture in the block, wherein the punch aperture is configured to guide a tip of the punch into position to deform a c-seal seated in a seal channel of the flange.

2. The system as recited in claim 1, wherein the at least one punch aperture is a plurality of punch apertures, each punch aperture configured to guide the tip of the punch into position to deform a c-seal seated in a seal channel of the flange.

3. The system as recited in claim 2, wherein each punch aperture in the plurality of punch apertures includes a bushing seated therein, wherein the bushing is configured to facilitate guided movement of the punch through the respective aperture in the block.

4. The system as recited in claim 1, wherein the block includes a plurality of pin apertures therethrough for receiving pins to engage with holder through mounting apertures in the flange of the fuel injector.

5. The system as recited in claim 4, wherein the block includes a plurality of pin apertures therethrough for receiving pins to engage with the holder through mounting apertures in the flange of the fuel injector, wherein the punch apertures alternate with the pin apertures in a circumferential pattern around the block.

6. The system as recited in claim 5, wherein the block includes three punch apertures and four pin apertures.

7. The system as recited in claim 1, wherein the block defines a u-shape about a main channel configured to accommodate a feed arm of the fuel injector.

8. The system as recited in claim 7, wherein the holder defines a u-shape about a main channel, wherein the holder and block are mounted to the flange with the u-shape of the holder opening in an opposite direction from that of the block.

9. The system as recited in claim 1, wherein the tip of the punch is shaped to fit within the seal channel.

10. The system as recited in claim 9, wherein the punch includes an enlarged end opposite the tip.

11. A method comprising:
    removing a fuel injector from a system;
    seating the fuel injector in a holder;
    affixing a block to the fuel injector and holder, wherein the block includes a plurality of punch apertures therethrough;
    inserting a punch into one of the punch apertures;
    striking the punch with a force to deform a c-seal engaged with the fuel injector;
    removing the block from the holder and fuel injector; and
    removing the c-seal from the fuel injector.

12. The method as recited in claim 11, wherein inserting the punch into one of the punch apertures and striking the punch are repeated for each of the punch apertures.

13. The method as recited in claim 11, wherein affixing the block to the fuel injector and holder includes seating a respective pin aperture of the block onto a respective pin passing from the holder through flange of the fuel injector.

14. The method as recited in claim 11, wherein the block defines a u-shape about a main channel, wherein affixing the block includes accommodating a feed arm of the fuel injector in the main channel.

15. The method as recited in claim 14, wherein the holder defines a u-shape about a main channel, wherein affixing the block includes affixing the block so the holder and block are mounted to the flange with the u-shape of the holder opening in an opposite direction from that of the block.

\* \* \* \* \*